United States Patent
Hsu et al.

(10) Patent No.: US 7,612,835 B2
(45) Date of Patent: Nov. 3, 2009

(54) BISTABLE LIQUID CRYSTAL DISPLAYS AND THE METHOD FOR DRIVING THE SAME

(75) Inventors: Jy Shan Hsu, Jhunan Township, Miaoli County (TW); Bau Jy Linag, Hsinchu (TW); Shu Hsia Chen, Hsinchu (TW); Ping Wen Huang, Taichung (TW)

(73) Assignee: Wintek Corporation, Taichung (TW)

( * ) Notice: Subject to any disclaimer, the term of this patent is extended or adjusted under 35 U.S.C. 154(b) by 629 days.

(21) Appl. No.: 11/321,452

(22) Filed: Dec. 30, 2005

(65) Prior Publication Data

US 2006/0164351 A1    Jul. 27, 2006

(30) Foreign Application Priority Data

Dec. 31, 2004    (TW) .............................. 93141561 A

(51) Int. Cl.
*G02F 1/33*    (2006.01)

(52) U.S. Cl. ...................... 349/36; 349/76; 349/123; 349/179

(58) Field of Classification Search ......... 349/123–126, 349/130, 132, 177, 36, 37, 76, 179, FOR. 134, 349/FOR. 141

See application file for complete search history.

(56) References Cited

U.S. PATENT DOCUMENTS

| 7,430,030 B2 * | 9/2008 | Sikharulidze ............... 349/125 |
| 2002/0191136 A1 * | 12/2002 | Yoneya et al. ............... 349/123 |
| 2007/0139595 A1 * | 6/2007 | Kwok et al. ................. 349/126 |

OTHER PUBLICATIONS

Jy-Shan Hsu et al., "Bistable chiral tilted-homeotropic nematic liquid crystal cells", Applied Physics Letters, Dec. 6, 2004, vol. 85, No. 23.

* cited by examiner

*Primary Examiner*—Hemang Sanghavi

(57) ABSTRACT

A bistable chiral tilted-homeotropic nematic liquid crystal (BCTHN) display can be switched between the tilted-homeotropic state (TH state) and the twisted state (T state) by using dual frequency liquid crystal material. These two states can be maintained without the application of any electric field. The bistable liquid crystal display does not need high voltage to induce the flow of liquid crystal or break the anchoring energy.

10 Claims, 8 Drawing Sheets

(a) TH state  (b) BH state  (c) T state  (d) BT state

US 7,612,835 B2

BISTABLE LIQUID CRYSTAL DISPLAYS AND THE METHOD FOR DRIVING THE SAME

This application claims the priority benefit of Taiwan Patent Application Serial Number 093141561 filed Dec. 31, 2004, the full disclosure of which is incorporated herein by reference.

BACKGROUND OF THE INVENTION

1. Field of the Invention

The present invention relates to a liquid crystal display, and more particularly, to a bistable liquid crystal display.

2. Description of the Related Art

Bistable liquid crystal displays have received considerable attention recently because they can operate at lower power levels at their two stable states without the application of any electric field.

Among the bistable devices, the bistable twisted nematic liquid crystal cell can be switched between the ($\psi-\pi$) and ($\psi+\pi$) twisted states by controlling the flow effect. However, the durations for the liquid crystal maintaining these two states are not very long. Indeed, the intermediate $\psi$ state is more stable. Although a long-term bistability has been achieved by using multidimensional alignment structure to prevent the liquid crystal of the $\psi$ state from nucleation, the application is still limited. To make the states of the liquid crystal truly stable, the $\pi$-BTN liquid crystal cells including BiNem, COP-BTN and SCBN-LC, which also use flow effect to switch between $\psi$ state and ($\psi+\pi$) state, are demonstrated one after another. However, the BiNem and COP-BTN liquid crystal cells need asymmetric anchoring energy substrates in order to achieve anchoring energy breaking and the SCBN-LC and COP-BTN liquid crystal cells need three-terminal electrode structure to produce the horizontal and vertical fields to switch states. The manufacture processes of these special substrates are not only difficult to be controlled but also difficult to match the standards for LC display. There are also other designs of the bistable display such as the ZBD (Zenithal Bistable Display) and the micro-patterned surface alignment device that have very long-term bistability. However the substrates of the ZBD which have the microstructure relief grating with short pitch and deep profile, and the micro-patterned surface alignment device which use the atomic force microscope (AFM) nano-rubbing technique to have orientational patterns are even more delicate and not easy to be manufactured.

In view of the above reasons, there exists a need for a bistable liquid crystal display which overcomes the above-mentioned problems in the prior art. This invention addresses this need in the prior art as well as other needs, which will become apparent to those skilled in the art from this disclosure.

SUMMARY OF THE INVENTION

It is an object of the present invention to provide a bistable liquid crystal display that can be driven to switch between two stable states thereof by applying driving signals of different frequencies.

In one embodiment, the bistable liquid crystal display includes two opposing upper and lower substrates, two transparent electrode layers, two alignment layers, two polarizers, a signal source and a liquid crystal layer. The two transparent electrode layers are disposed respectively on the upper and lower substrates and between the upper and lower substrates. The two alignment layers are disposed respectively on the two transparent electrode layers. The upper polarizer is disposed above the upper substrate and lower polarizer is disposed under the lower substrate. The liquid crystal layer is disposed between the two alignment layers and has a plurality of dual frequency liquid crystal molecules. The liquid crystal layer has a stable tilted homeotropic state and a stable twisted state. When a first driving signal of first frequency generated by the signal source is applied to the liquid crystal layer for a first predetermined period of time and then the application of the first driving signal to the liquid crystal layer stops, the liquid crystal layer will switch to the tilted homeotropic state. A second driving signal of second frequency generated by the signal source is applied subsequently to the liquid crystal layer for a second predetermined period of time and then the application of the second driving signal to the liquid crystal layer stops, the liquid crystal layer will switch to the twisted state.

In another embodiment, the bistable liquid crystal display includes all the elements of the bistable liquid crystal display described in the above embodiment except that a dichromatic dye is dispersed within the liquid crystal molecules to substitute the two polarizers.

It is another object of the present invention to provide a method for driving a bistable liquid crystal display so that the display can be driven to switch between two stable states thereof by applying driving signals of different frequencies.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
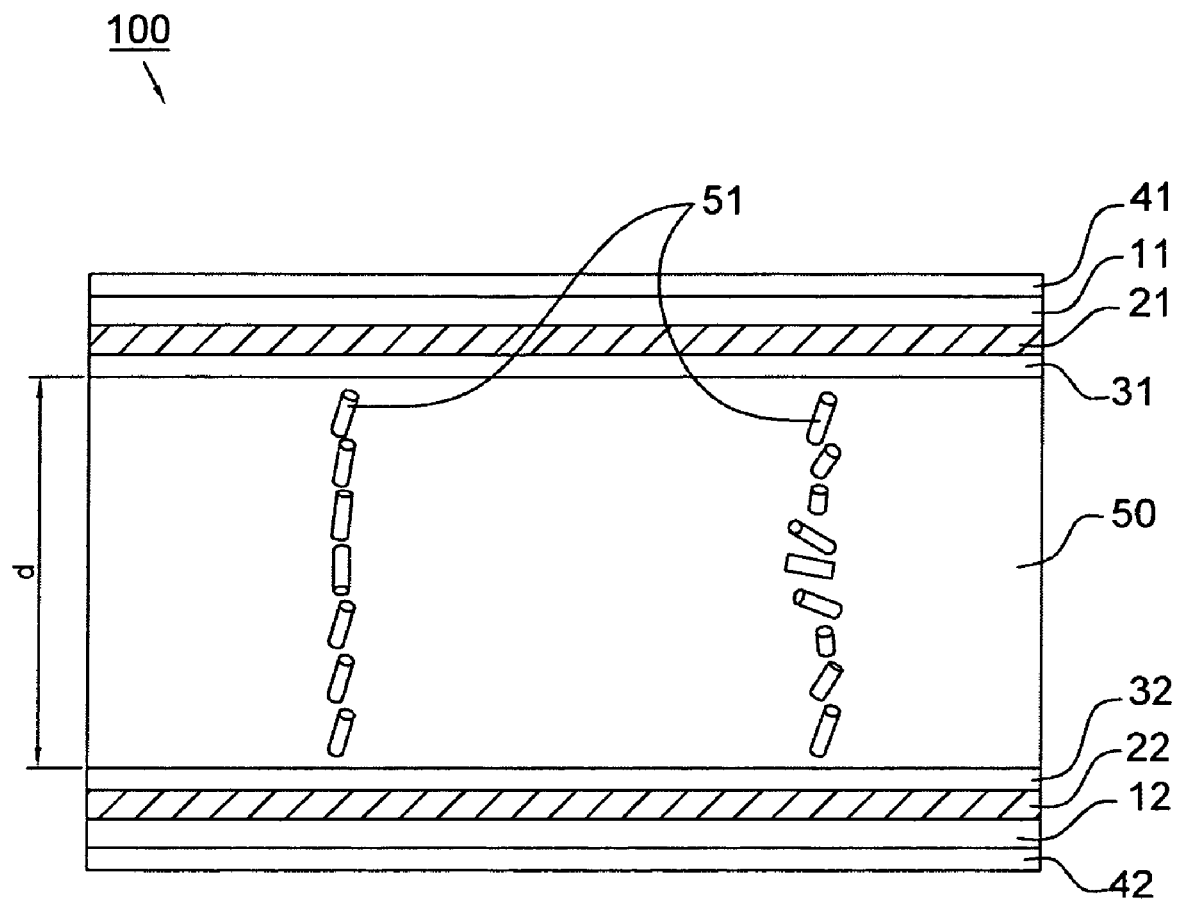
FIG. 1 is a schematic diagram showing a bistable liquid crystal display according to an embodiment of the present invention.

Reference is now made to FIG. 1 where there is shown a bistable liquid crystal display 100 according to an embodiment of the present invention. The liquid crystal display 100 includes two opposing upper and lower substrates 11, 12. Two electrode layers 21, 22 made from transparent indium tin oxide (ITO) are disposed respectively on the upper and lower substrates 11, 12 and between the substrates 11, 12. Two alignment layers 31, 32 formed by e.g. coating the RN-1338 material of Nissan Chemicals Co. are disposed on the electrode layers 21, 22 respectively and between the electrode layers 21, 22. The alignment layers 31, 32 have a pre-tilt angle of smaller than 87 degrees, preferably from 45 to 87 degrees and are made from e.g. a rubbing material or an optical material. An upper polarizer 41 is disposed above the upper substrate 11 and a lower polarizer 42 is disposed under the lower substrate 12. The angle between the absorption axes of the polarizers 41, 42 ranges from about 80 to 100 degrees. The angle between the absorption axis of the upper polarizer 41 and the alignment direction of the alignment layer 31 ranges from 0 to 180 degrees. A liquid crystal layer 50 is disposed between the alignment layers 31, 32 and has a plurality of dual frequency liquid crystal molecules 51, for example, MLC-2048 materials of Merck Co. The MLC-2048 material has a dielectric anisotropy ($\Delta\in$) of 3.22 at frequency of 1 KHz and a dielectric anisotropy of −3.4 at frequency of 100 KHz.

In addition, the ratio of the thickness (d) of the liquid crystal layer 50 to the pitch (p) of the liquid crystal molecule 51 ranges from 0.01 to 1.55, preferably from 0.8 to 1.05. The splay elastic constant $K_{11}$, twist elastic constant $K_{22}$ and bend elastic constant $K_{33}$ of the molecules 51 have relations as follows: $K_{33}/K_{11} > 0.865$, $K_{22}/K_{11} < 0.98$.

Figure 2:
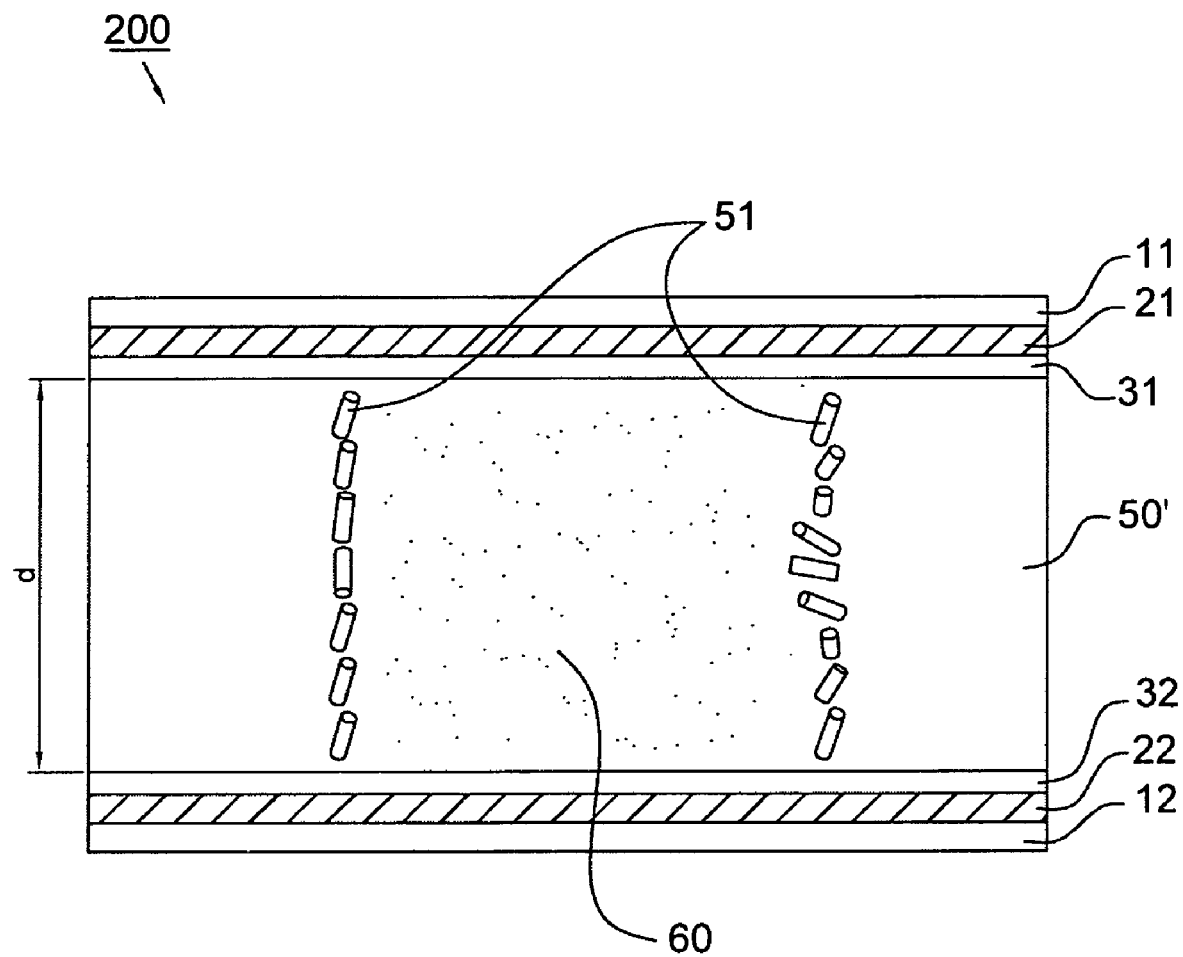
FIG. 2 is a schematic diagram showing a bistable liquid crystal display according to another embodiment of the present invention.

Reference is now made to FIG. 2 where there is shown a bistable liquid crystal display 200 according to another embodiment of the present invention. The liquid crystal display 200 includes two opposing upper and lower substrates 11, 12. Two electrode layers 21, 22 made from transparent indium tin oxide (ITO) are disposed on the upper and lower substrates 11, 12 respectively and between the substrates 11, 12. Two alignment layers 31, 32 formed by e.g. coating the RN-1338 material of Nissan Chemicals Co. are disposed on the electrode layers 21, 22 respectively and between the electrode layers 21, 22. The alignment layers 31, 32 have a pre-tilt angle of smaller than 87 degrees, preferably from 45 to 87 degrees and are made from e.g. a rubbing material or an optical material.

The differences between the display 200 of FIG. 2 and the display 100 of FIG. 1 are that polarizers are not necessary for the display 200 and dichromatic dyes 60 are dispersed within a plurality of dual frequency liquid crystal molecules 51 between the alignment layers 31, 32. The liquid crystal molecules 51 and the dichromatic dyes 60 collectively form a liquid crystal layer 50'. The dual frequency liquid crystal molecules 51, for example, MLC-2048 materials of Merck Co. still have a dielectric anisotropy ($\Delta\in$) of 3.22 at frequency of 1 KHz and a dielectric anisotropy of −3.4 at frequency of 100 KHz.

In addition, the ratio of the thickness (d) of the liquid crystal layer 50 to the pitch (p) of the liquid crystal molecule 51 ranges from 0.01 to 1.55, preferably from 0.8 to 1.05. The splay elastic constant $K_{11}$, twist elastic constant $K_{22}$ and bend elastic constant $K_{33}$ of the molecules 51 have relations as follows: $K_{33}/K_{11} > 0.865$, $K_{22}/K_{11} < 0.98$.

Figure 3A:
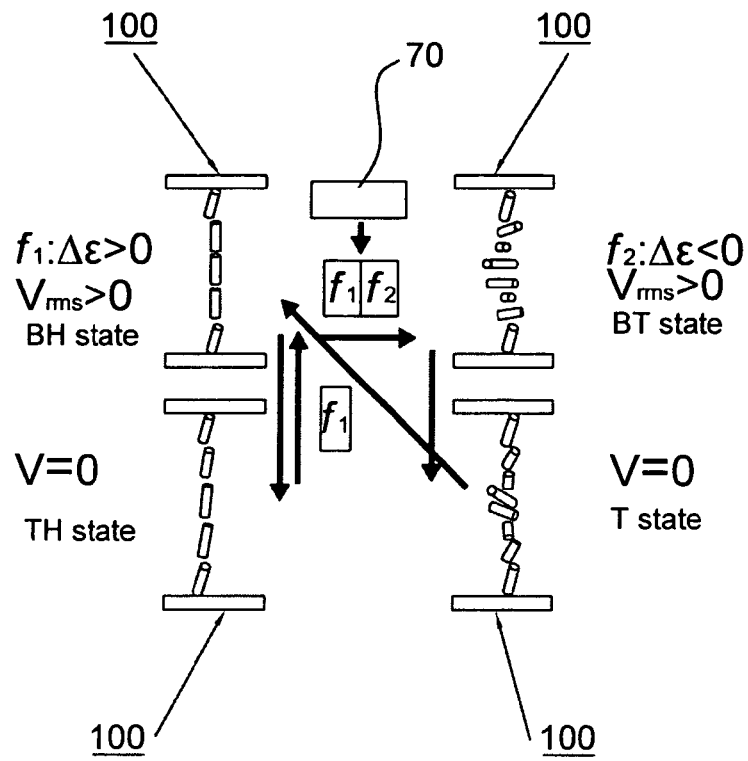
FIGS. 3a and 3b show that switches between two driving signals cause the liquid crystal layer of the liquid crystal display according to the present invention to switch between the tilted homeotropic state and the twisted state.
Figure 3B:
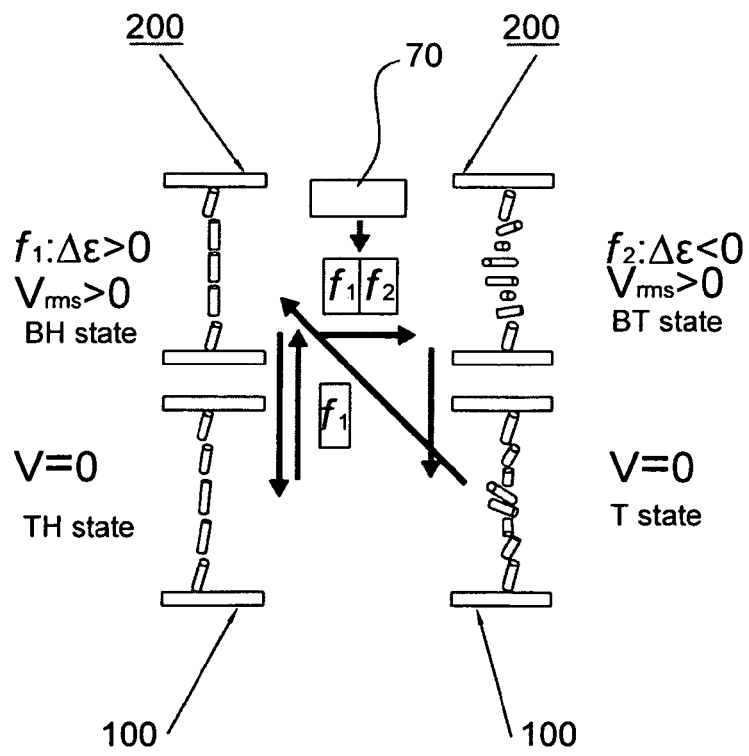

Referring to FIGS. 3a and 3b, they show that the switches between two driving signals cause the liquid crystal molecules of the liquid crystal display according to the present invention to switch between the tilted homeotropic state and the twisted state. A signal source 70 is used as a signal generator for the bistable liquid crystal displays 100, 200 of the present invention and capable of generating driving signals of different frequencies and/or different voltages to drive the molecules 51 in the liquid crystal layers 50, 50'. As the liquid crystal layers 50, 50' are in the stable twisted state (T state), an application of a lower frequency $f_1$ driving signal for a predetermined period of time will render the liquid crystal layers 50, 50' switch to the biased homeotropic state (BH state) and the dielectric anisotropy ($\Delta\in$) of the liquid crystal molecules 51 changes to a value of greater than zero. After finishing the application of the frequency $f_1$ driving signal, the liquid crystal layers 50, 50' will switch to the stable titled homeotropic state (TH state). An application of another frequency $f_1$ driving signal to the liquid crystal layers 50, 50' of the TH state will render them come back to the BH state. A subsequent application of a higher frequency $f_2$ driving signal to the liquid crystal layers 50, 50' will render them switch to the biased twisted state (BT state) and the dielectric anisotropy ($\Delta\in$) of the liquid crystal molecules 51 change to a value of smaller than zero. After finishing the application of the frequency $f_2$ driving signal, the liquid crystal layers 50, 50' will come back to the stable T state.

To implement the bistable liquid crystal display 100, an indium tin oxide (ITO) glass is used as the substrates 11, 12 and the RN-1338 of Nissan Chemicals Co. is spin coated thereon to form the tiled-homeotropic alignment layers 31, 32. The rubbing directions of the alignment layers are anti-parallel. The dual frequency liquid crystal material 51 used in the liquid crystal layer 50 is MLC-2048 of Merck Co. with $\Delta\in = 3.22$ at frequency of 1 KHz and $\Delta\in = −3.4$ at frequency of 100 KHz. The substrates 11, 12 are combined together by using 9.9-micron spacers mixed with adhesive and the MLC-2048 material with a pitch of 10 microns is filled between the substrates 11, 12. As the liquid crystal cell is first assembled, the TH state and T state of the liquid crystal molecules 51 will coexist. After applying a 1 KHz driving signal, the liquid crystal layer 50 will present a dark state under crossed polarizer condition.

The optical properties of the liquid crystal layer 50 are measured under a crossed polarizer condition. The light source is He—Ne laser with a wavelength of 632.8 nm. If the liquid crystal layer 50 is in the TH state or BH state, the light goes through the liquid crystal layer 50 with little phase retardation so that the appearance of the liquid crystal layer 50 is dark and the transmittance is low. On the other hand, if the liquid crystal layer 50 is in the T state or BT state, the transmittance is higher.

Figure 4:
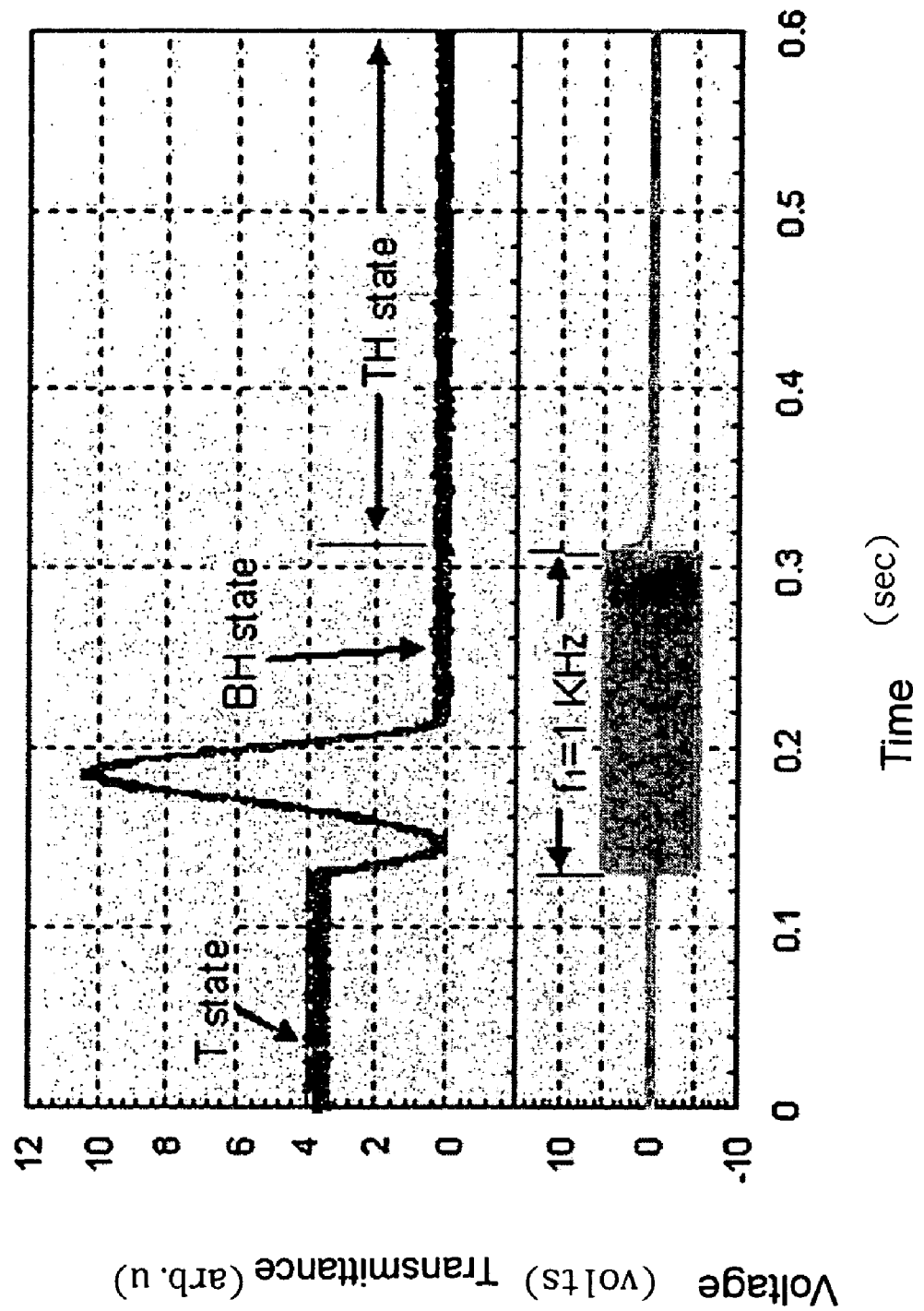
FIG. 4 shows the transient transmittance of the bistable liquid crystal layer according to the present invention from T state to TH state and the corresponding voltages applied to the liquid crystal layer.

FIG. 4 shows the transient transmittance of the bistable liquid crystal layer 50 from the T state to TH state. The driving signal applied to the liquid crystal layer 50 is 5 volts with a frequency of 1 KHz. Therefore, the liquid crystal molecules 50 are positive anisotropic when the signal is applied. The transmittance of the liquid crystal layer 50 oscillates due to the phase retardation change when the twisted liquid crystal molecules 51 are pulled to the vertical direction and most of the liquid crystal molecules 51 are vertically aligned (BH state), the liquid crystal layer 50 is dark. When the applied voltage is off, the liquid crystal molecules 51 relax to the TH state, which the transmittance is also very low.

Figure 5:
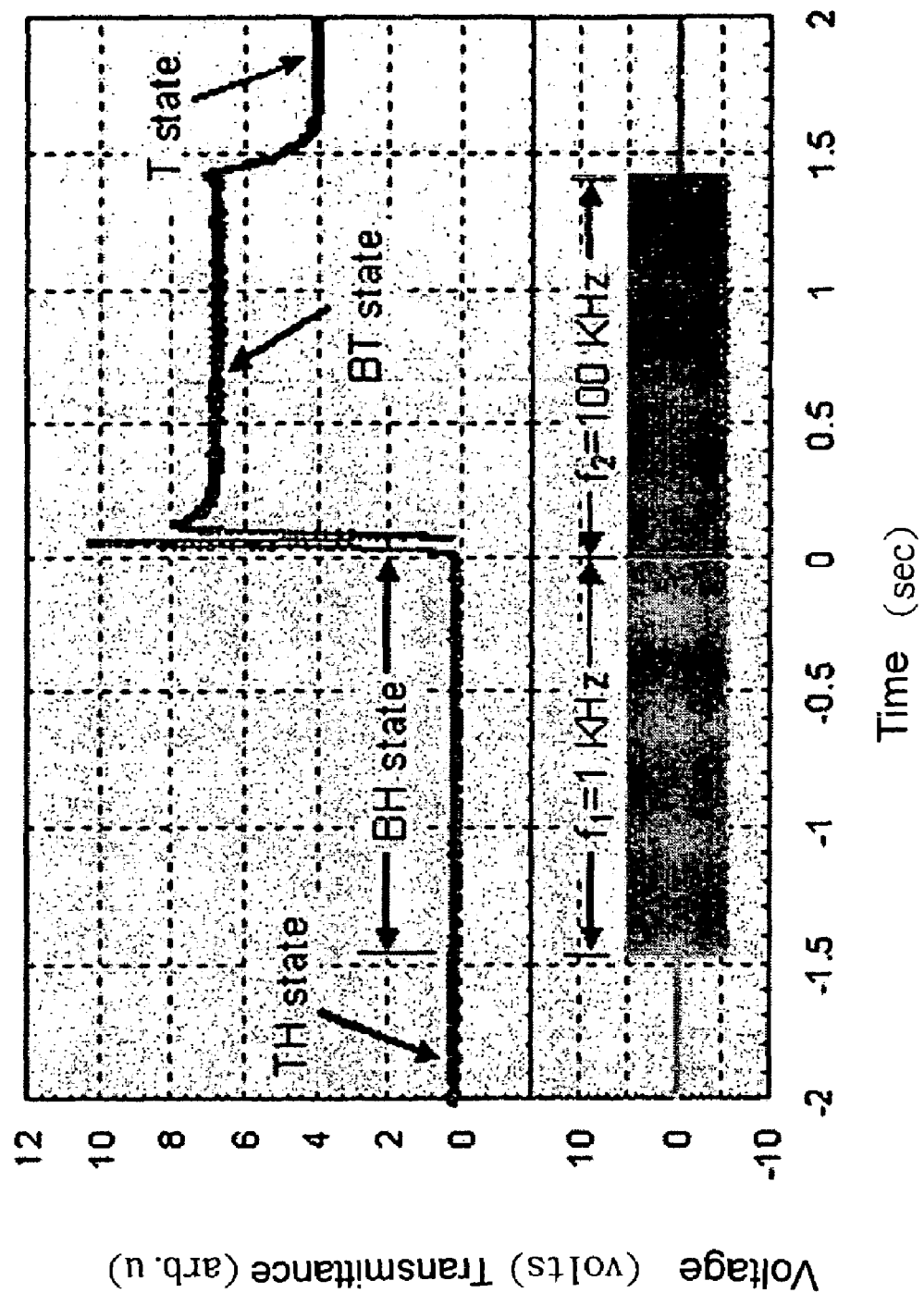
FIG. 5 shows the transient transmittance of the bistable liquid crystal layer according to the present invention from TH state to T state and the corresponding voltages applied to the liquid crystal layer.

To switch from the TH state to the T state, a driving signal of 5 volts, 1 KHz is applied to the liquid crystal layer 50 first. The liquid crystal molecules 51 are in the BH state and the transmittance of the liquid crystal layer 50 is almost unchanged. Then, the frequency of driving signal is changed to 100 KHz suddenly, the liquid crystal molecules 51 of the middle director tilt down in the opposite director due to the back flow effect. Finally, the liquid crystal molecules 51 are in the T state. The transmittance oscillates also due to the phase retardation change and at last the liquid crystal layer 50 is in the BT state. When the applied signal is off, the liquid crystal layer 50 relaxes to the T state, which is a bright state. FIG. 5 shows the results of the process.

Figure 6:
FIG. 6 shows the microscopic pictures of TH state, BH state, T state and BT state with a He—Ne laser as a light source to illuminate the liquid crystal layer.
Figure 6:
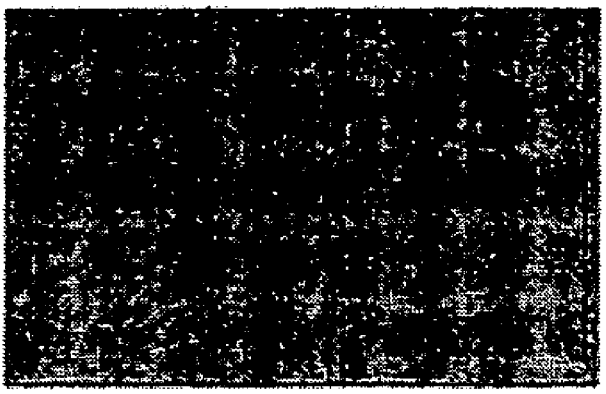
Figure 6:
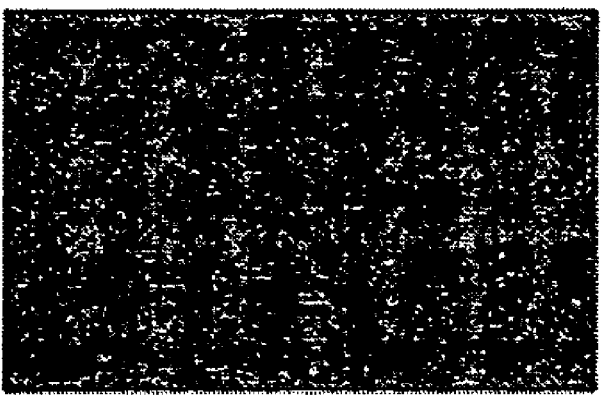
Figure 6:

FIG. 6 shows the microscopic pictures of TH state, BH state, T state and BT state under the crossed polarizer condition with rubbing direction parallel to the polarizer. The TH state is not as dark as BH state because the directors of the TH state are tilted with a helical structure and a very small conic angle if misalignment of the substrates exists when most directors of the BH state are vertically aligned. When a He—Ne laser is used as a light source, the BT state is reddish while the T state is greenish, and therefore the BT state has a higher transmittance but is darker as taking picture under the microscope.

Figure 7:
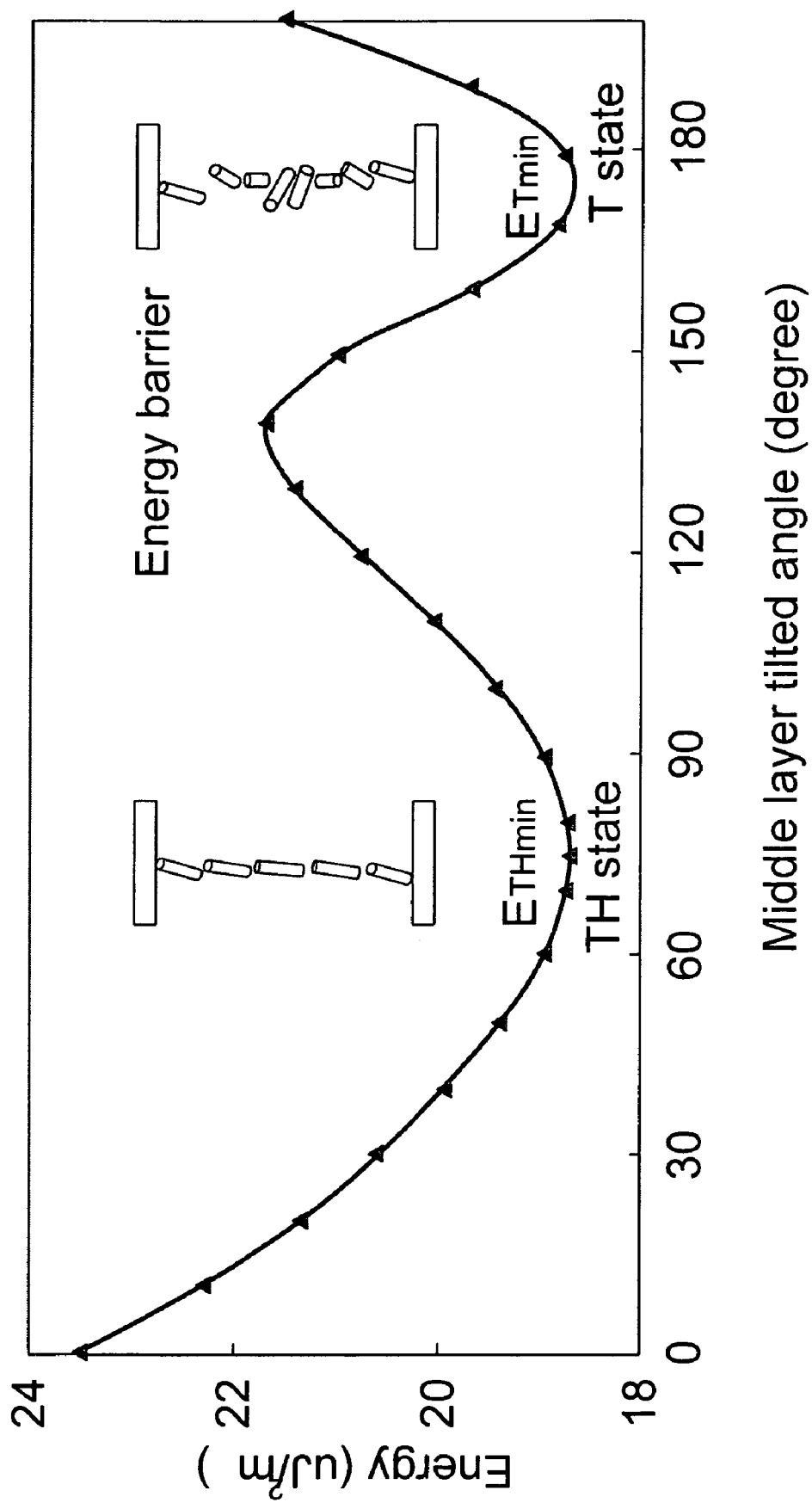
FIGS. 7-9 show the static simulation results of the bistable liquid crystal display according to the present invention

Reference is now made to FIG. 7 where there is shown the static simulation result of the bistable liquid crystal display according to the present invention, wherein the abscissa is tilted angle of middle director of liquid crystal layer in degree and the ordinate is energy of liquid crystal molecules in $\mu J/m^2$. The splay elastic constant $K_{11}$, twist elastic constant $K_{22}$ and bend elastic constant $K_{33}$ of the liquid crystal molecule is 17.34, 9.597 and 30.26 respectively. The thickness of the liquid crystal layer is 9.9 μm. The pitch of the liquid crystal molecule is 10 μm and the pre-tilt angle of the alignment layers is 75 degrees. As shown in FIG. 7, there are two local minima in the curve of simulation. Such a result reflects the fact that the liquid crystal layer has two stable states in the bistable liquid crystal display, wherein one is the TH state and the other is the T state. The local maximum in the curve of simulation indicates the energy barrier required to overcome when the liquid crystal layer is driven to switch from its one stable state to another.

Figure 8:
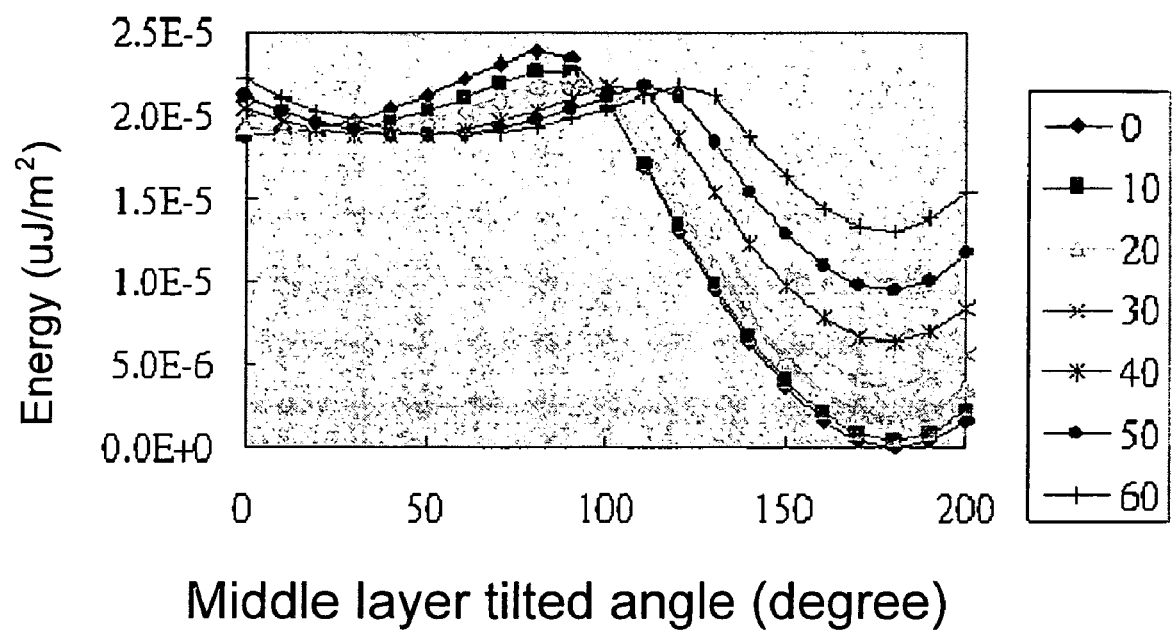
Figure 9:
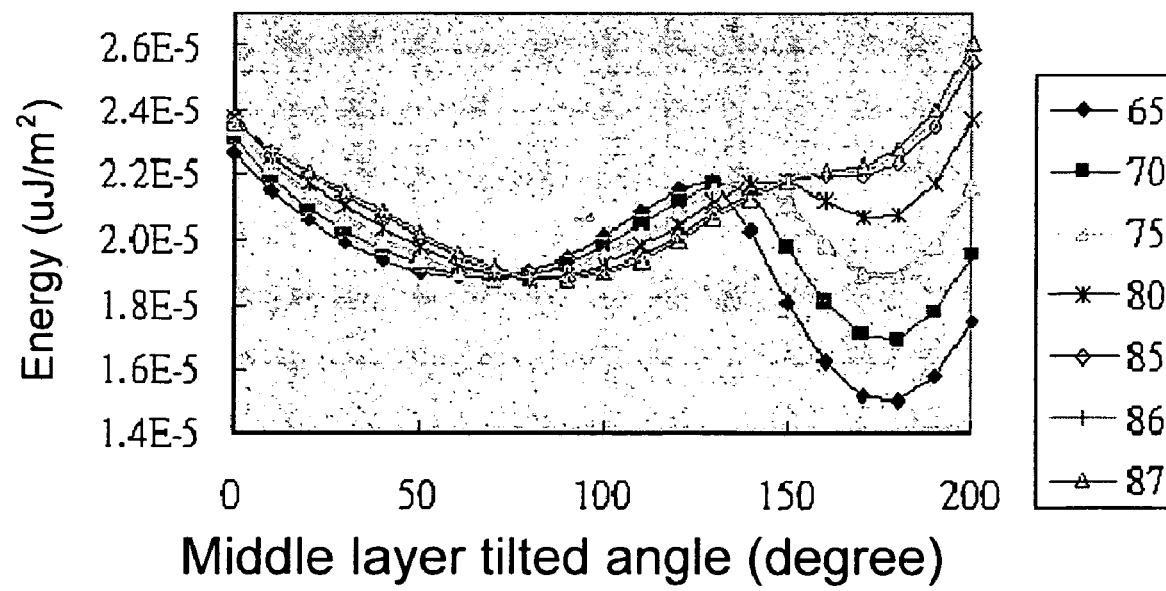

FIGS. 8 and 9 show the static simulation results of the bistable liquid crystal display according to the present invention under the condition of different pre-tilt angles. All the parameters except pre-tilt angles used to obtain the simulation results in FIGS. 8 and 9 are identical to the parameters in FIG. 7. Thus, any further illustrations regarding the parameters are omitted herein. As shown in FIGS. 8 and 9, each curve of simulation has two local minima and one local maximum. In other words, the liquid crystal layers in the bistable liquid crystal displays according to the present invention have two stable states under the condition of pre-tilt angles ranging from 0 to 87 degrees.

Reference is now made to Table 1 where there is shown the range of the ratio (d/p) of the liquid crystal layer thickness (d) to the pitch (p) of liquid crystal molecules under the condition of different pre-tilt angles when the liquid crystal layer has two stable states. As shown in Table 1, the ratios (d/p) range from 0.01 to 1.55 under the condition of liquid crystal layer thickness of 9.9 μm and pre-tilt angles ranged from 0 to 87 degrees when the liquid crystal layer has two stable states.

TABLE 1

| pre-tilt angle | thickness (μm) | range of d/p |
|---|---|---|
| 0° | 9.9 | 0.01~1.45 |
| 5° | 9.9 | 0.01~1.35 |
| 15° | 9.9 | 0.01~1.4 |
| 25° | 9.9 | 0.05~1.45 |
| 35° | 9.9 | 0.01~1.45 |
| 45° | 9.9 | 0.1~1.5 |
| 55° | 9.9 | 0.3~1.5 |
| 65° | 9.9 | 0.55~1.55 |
| 75° | 9.9 | 0.75~1.55 |
| 85° | 9.9 | 1.0~1.55 |
| 87° | 9.9 | 1.0~1.1 |

Tables 2, 3 and 4 show the range of the ratio (d/p) of the liquid crystal layer thickness (d) to the pitch (p) of liquid crystal molecules under the condition of different $K_{11}$, $K_{22}$ and $K_{33}$ when the liquid crystal layer has two stable states. As shown in the tables, the ratios (d/p) range from 0.01 to 1.55 under the condition of $K_{33}/K_{11}>0.865$ and $K_{22}/K_{11}<0.98$ when the liquid crystal layer has two stable states.

TABLE 2

K11 = 17.34, K22 = 9.597, K33 = 25.0

| pre-tilt angle | thickness (μm) | range of d/p |
|---|---|---|
| 5° | 9.9 | 0.01~1.5 |
| 15° | 9.9 | 0.01~1.5 |
| 25° | 9.9 | 0.01~1.35 |
| 35° | 9.9 | 0.1~1.35 |
| 45° | 9.9 | 0.3~1.2 |
| 55° | 9.9 | 0.45~1.15 |
| 65° | 9.9 | 0.65~1.15 |
| 75° | 9.9 | 0.8~1.15 |
| 85° | 9.9 | 1.0~1.15 |

TABLE 3

K11 = 17.34, K22 = 9.597, K33 = 16.0

| pre-tilt angle | thickness (μm) | range of d/p |
|---|---|---|
| 5° | 9.9 | 0.01~1.25 |
| 15° | 9.9 | 0.2~1.25 |
| 25° | 9.9 | 0.35~1.2 |
| 35° | 9.9 | 0.4~0.95 |
| 45° | 9.9 | 0.5~0.85 |
| 55° | 9.9 | 0.6~0.8 |
| 65° | 9.9 | 0.7~0.8 |
| 70° | 9.9 | 0.7~0.75 |

TABLE 4

K11 = 17.34, K22 = 14.5, K33 = 30.26

| pre-tilt angle | thickness (μm) | range of d/p |
|---|---|---|
| 5° | 9.9 | 0.01~1.3 |
| 15° | 9.9 | 0.05~1.3 |
| 25° | 9.9 | 0.15~1.15 |
| 35° | 9.9 | 0.25~1.05 |
| 45° | 9.9 | 0.4~0.95 |
| 55° | 9.9 | 0.5~0.95 |
| 65° | 9.9 | 0.6~0.95 |
| 75° | 9.9 | 0.75~0.95 |
| 85° | 9.9 | 0.85~0.95 |

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A bistable liquid crystal display, comprising:
   two opposing upper and lower substrates;
   two transparent electrode layers disposed respectively on the upper and lower substrates and between the upper and lower substrates;
   two alignment layers disposed respectively on the two transparent electrode layers;
   a signal source for generating a first driving signal and a second driving signal, the first driving signal having a first frequency and the second driving signal having a second frequency; and a liquid crystal layer disposed between the two alignment layers, the liquid crystal layer having a plurality of dual frequency liquid crystal molecules and a dichromatic dye, the liquid crystal layer having a stable tilted homeotropic state and a stable twisted state in such a manner when the first driving signal of the first frequency is applied to the liquid crystal layer for a first predetermined period of time and then the application of the first driving signal to the liquid crystal layer stops, the liquid crystal layer will switch to the tilted homeotropic state, the second driving signal of the second frequency is applied subsequently to the liquid crystal layer for a second predetermined period of time and then the application of the second driving signal to the liquid crystal layer stops, the liquid crystal layer will switch to the twisted state.

2. The bistable liquid crystal display as claimed in claim 1, wherein the liquid crystal layer further has a biased homeotropic state and a biased twisted state, when the liquid crystal layer of the tilted homeotropic state is applied the first driving signal of the first frequency, the liquid crystal layer will switch to the biased homeotropic state, the liquid crystal layer is applied subsequently the second driving signal of the second frequency, the liquid crystal layer will switch to the biased twisted state.

3. The bistable liquid crystal display as claimed in claim 1, wherein the liquid crystal layer further has a biased homeotropic state, when the liquid crystal layer of the twisted state is applied the first driving signal of the first frequency for a third predetermined period of time, the liquid crystal layer will switch to the biased homeotropic state, after the application of the first driving signal to the liquid crystal layer stops, the liquid crystal layer will switch to the tilted homeotropic state.

4. The bistable liquid crystal display as claimed in claim 1, wherein the first frequency is lower than the second frequency, the first frequency makes the dielectric anisotropy of the liquid crystal molecules positive.

5. The bistable liquid crystal display as claimed in claim 1, wherein the first frequency is lower than the second frequency, the second frequency makes the dielectric anisotropy of the liquid crystal molecules negative.

6. The bistable liquid crystal display as claimed in claim 1, wherein the alignment layers are made from a rubbing material.

7. The bistable liquid crystal display as claimed in claim 1, wherein the alignment layers are made from an optical material.

8. The bistable liquid crystal display as claimed in claim 1, wherein the alignment layers have a pre-tilt angle of smaller than 87 degrees.

9. The bistable liquid crystal display as claimed in claim 1, wherein the ratio of the thickness of the liquid crystal layer to the pitch of the liquid crystal molecule ranges from 0.01 to 1.55.

10. The bistable liquid crystal display as claimed in claim 1, wherein the splay elastic constant $K_{11}$, twist elastic constant $K_{22}$ and bend elastic constant $K_{33}$ of the liquid crystal molecules have relations as follows: $K_{33}/K_{11}$ greater than 0.865, $K_{22}/K_{11}$ smaller than 0.98.

* * * * *

UNITED STATES PATENT AND TRADEMARK OFFICE
CERTIFICATE OF CORRECTION

PATENT NO. : 7,612,835 B2
APPLICATION NO. : 11/321452
DATED : November 3, 2009
INVENTOR(S) : Hsu et al.

It is certified that error appears in the above-identified patent and that said Letters Patent is hereby corrected as shown below:

On the title page, the names of the inventors should read as follows:

Item (75) Inventors: Jy Shan Hsu, Jhunan Township, Miaoli County (TW); Bau Jy Liang, Hsinchu (TW); Shu Hsia Chen, Hsinchu (TW); Ping Wen Huang, Taichung (TW)

Signed and Sealed this

Thirteenth Day of July, 2010

David J. Kappos
*Director of the United States Patent and Trademark Office*